United States Patent
Cognigni et al.

(10) Patent No.: US 7,882,496 B2
(45) Date of Patent: Feb. 1, 2011

(54) METHOD AND SYSTEM FOR METERING EXECUTION OF INTERPRETED PROGRAMS

(75) Inventors: Giorgio Cognigni, Rome (IT); Marco Mechelli, Rome (IT); Claudio Morgia, Rome (IT); Bernardo Pastorelli, L'Aguila (IT)

(73) Assignee: International Business Machines Corporation, Armonk, NY (US)

( * ) Notice: Subject to any disclaimer, the term of this patent is extended or adjusted under 35 U.S.C. 154(b) by 1646 days.

(21) Appl. No.: 11/141,579

(22) Filed: May 31, 2005

(65) Prior Publication Data

US 2005/0268290 A1     Dec. 1, 2005

(30) Foreign Application Priority Data

Jun. 1, 2004   (EP)   ................................. 04102427

(51) Int. Cl.
G06F 9/44      (2006.01)
G06F 9/445     (2006.01)

(52) U.S. Cl. .............. 717/126; 717/127; 717/128; 717/130; 717/131; 717/120; 717/139; 717/166

(58) Field of Classification Search .............. None
See application file for complete search history.

(56) References Cited

U.S. PATENT DOCUMENTS

| | | | | |
|---|---|---|---|---|
| 5,469,574 A | * | 11/1995 | Chang et al. | 717/106 |
| 5,673,315 A | * | 9/1997 | Wolf | 705/59 |
| 6,021,438 A | * | 2/2000 | Duvvoori et al. | 709/224 |
| 6,918,126 B1 | * | 7/2005 | Blais | 719/332 |
| 6,931,544 B1 | * | 8/2005 | Kienhofer et al. | 717/118 |
| 7,533,101 B2 | * | 5/2009 | Bond et al. | 1/1 |
| 7,546,587 B2 | * | 6/2009 | Marr et al. | 717/127 |
| 2002/0095661 A1 | * | 7/2002 | Angel et al. | 717/130 |
| 2004/0039926 A1 | * | 2/2004 | Lambert | 713/189 |

OTHER PUBLICATIONS

Access method Monitor, May 1, 1974, IBM Technical Disclosure Bulletin, vol. #16, Page No. 3834-3835.*

* cited by examiner

Primary Examiner—Lewis A Bullock, Jr.
Assistant Examiner—Chris Nelson
(74) Attorney, Agent, or Firm—Yee & Associates, P.C.; Jeffrey S. LaBaw

(57) ABSTRACT

Metering execution of interpreted programs on a data processing system is accomplished. An interpreted program requests a service to an interpreter running the interpreted program. The interpreter invokes a native external function for implementing the service. The invocation of the external function is intercepted. The interpreted program identified according to the external function by accessing a catalogue which associates native functions with interpreted programs. A license management operation is performed according to the identified interpreted program.

6 Claims, 7 Drawing Sheets

METHOD AND SYSTEM FOR METERING EXECUTION OF INTERPRETED PROGRAMS

TECHNICAL FIELD

The present invention relates to the data processing field. More specifically, the present invention relates to a method of metering execution of interpreted programs on a data processing system. The invention further relates to computer applications for performing the method, and to products embodying the applications. Moreover, the invention also relates to a corresponding metering system.

BACKGROUND ART

Software programs can be perfectly reproduced in an infinite number of copies. This is a major concern for publishers of the programs wishing to protect their intellectual property rights; indeed, the publishers typically receive a royalty for a licensed use of each program, so that any unaccounted use or distribution of the program results in unpaid royalties. The problem has been exacerbated in the last years by the widespread diffusion of the Internet, which further facilitates the uncontrolled distribution of this kind of products.

The most straightforward way of avoiding unaccounted usage of the programs is that of preventing unauthorized copying and transmission. For example, some programs embed control code that limits the number of copies that can be made or disables operation of the programs after a predetermined period of time has lapsed. Another technique consists of requiring possession of a software or hardware key for running the programs.

A different solution proposed in the art, known as technical licensing, consists of modifying each program to include a call to a licensing management system. Every time the program is started, a corresponding request is transferred to the licensing management system. The licensing management system verifies whether the running of the program is authorized. If the result of the verification is positive, the program can continue its execution; otherwise, the program is forced to stop.

However, the solutions described above require each program to be modified by the publisher, so that they are not of general applicability. In addition, the solutions known in the art are quite rigid and cannot be readily adapted to different requirements.

A different approach is based on an agent running in the background. The agent periodically checks the programs that are in execution. The result of the verification is logged, in order to generate program usage reports. Moreover, if a program is running violating its authorized conditions of use the agent may kill the respective process (so as to stop execution of the program), and may make the program unable to start again.

Alternatively, as described in WO-A-03038570, the agent detects any new process that is started in response to the request of execution of a program (for example, using a kernel hooking technique). The process is suspended and an authorization to run the program is requested to a metering server. If the authorization is granted, the process is resumed so as to enable the program to start. Conversely, the process is aborted thereby preventing execution of the program; this avoids killing the program while it is performing potentially risky operations.

However, none of the solutions described above can be applied to meter the usage of interpreted programs. As it is well known, an interpreted program consists of a logically sequenced series of instructions (written in a high-level language), which instructions are executed one at a time by an interpreter; the interpreted programs differ from compiled programs that are converted by a compiler into machine code being directly executable on the computer.

The interpreted programs are slower to run than compiled programs. This is due to the overhead resulting from their run-time analysis; moreover, access to variables takes longer time, because the mapping of identifiers to storage locations must be done repeatedly.

Nevertheless, the interpreted programs are particular attractive in open architectures, since they can be executed on different hardware and/or software platforms (provided that a corresponding interpreter is available). A typical example is that of applications written in the Java language, which applications are executed by a Java Virtual Machine (JVM) providing an abstract computing environment independent of the underlying platform of the computer. For this reason, the Java applications have attained a widespread diffusion in the last years (especially in the Internet).

In the above-described scenario, the licensing management systems known in the art would only detect the execution of the interpreter; conversely, no information is available about the interpreted programs that are executed by the interpreter (and that should be actually metered). This drawback prevents carrying out a full control of the programs that are running. The problem is very critical, since the interpreted programs (and particularly the Java applications) represent a large share of the market. Therefore, the economic loss suffered by the publishers may be considerable.

A possible solution could be that of exploiting profiling and/or debugging capabilities of some interpreters. For example, the Virtual Machine Profiler Interface (JVMPI) provides a two-way communication between the virtual machine and a profiler agent; particularly, the virtual machine notifies the profiler agent of various events and, vice-versa the profiler agent issues control requests to the virtual machine. In this way, the profiler interface can be used to detect the execution of any Java application by the virtual machine.

An alternative solution could be based on the Virtual Machine Debug Interface (JVMDI), which allows a debugger client to inspect and to control the state of the virtual machine. Even in this case, the debugger client can be notified of the execution of any Java application by the virtual machine.

However, those interfaces are not standard and are provided by some virtual machines only; therefore, the above-described solutions are not of general applicability. Moreover, this approach is very intrusive and interferes with the execution of the Java applications. Particularly, the profiler interface and the debug interface disable the run-time optimizations of the virtual machine; therefore, the performance of the Java applications is strongly impaired. As a consequence, the proposed solutions cannot be applied in a production environment. Moreover, the above-described technique prevents the use of the profiler interface and/or the debug interface for their real purpose (for example, to tune the Java applications).

SUMMARY OF THE INVENTION

It is an object of the present invention to provide a general solution for metering the execution of interpreted programs.

It is another object of the present invention to reduce any interference with the execution of the interpreted programs.

It is yet another object of the present invention to meter the execution of the interpreted programs with a minimal impact on their performance.

The accomplishment of these and other related objects is achieved by a solution, which is based on the interception of external functions being invoked by the interpreter.

Particularly, an aspect of the present invention provides a method of metering execution of interpreted programs on a data processing system, the method including the steps of: an interpreted program requesting a service to an interpreter running the interpreted program, the interpreter invoking an external function for implementing the service, intercepting the invocation of the external function, and identifying the interpreted program according to the external function.

In an embodiment of the invention, the external function consists of a native function of the system.

Preferably, the external function involves the loading of a new class; in this case, the interpreted program is identified according to the new class.

In a specific embodiment, the interpreter requests the loading of a dynamic library and then calls a command exposed by the dynamic library; a stub library is loaded instead of the dynamic library, so as to cause the calling of the command on the stub library.

In another embodiment, a request for the loading of the new class is received by a stub class loader replacing an original class loader.

Preferably, the stub class loader forwards the request for the loading of the new class to the original class loader. The stub class loader then verifies whether the loaded new class includes a main method for launching the interpreted program; in this case, a call to a verification module is inserted into the main method (for determining the interpreted program when the main method is executed).

Advantageously, an authorization to execute the interpreted program is verified; the invocation of the external function is then enabled in response to a positive result of the verification.

As a further enhancement, the invocation of the external function is prevented and an error message is returned to the interpreter in response to a negative result of the verification.

Further aspects of the present invention provide computer applications for performing the method and products embodying the applications.

Moreover, another aspect of the invention provides a corresponding metering system.

The solution of the present invention is of general applicability, and allows metering the execution of any interpreted programs. This advantage is especially perceived in licensing management systems (even if other applications are not excluded); indeed, the proposed solution enables a full control of the programs being executed.

Those results are achieved minimizing any interference with the actual execution of the interpreted programs.

Therefore, the solution of the invention does not adversely affect the performance of the interpreted programs (being its impact negligible in most practical situations); this solution is then well suited for application in production environments.

The novel features believed to be characteristic of this invention are set forth in the appended claims. The invention itself, however, as well as these and other related objects and advantages thereof, will be best understood by reference to the following detailed description to be read in conjunction with the accompanying drawings.

DETAILED DESCRIPTION OF THE PREFERRED EMBODIMENT(S)

Figure 1:
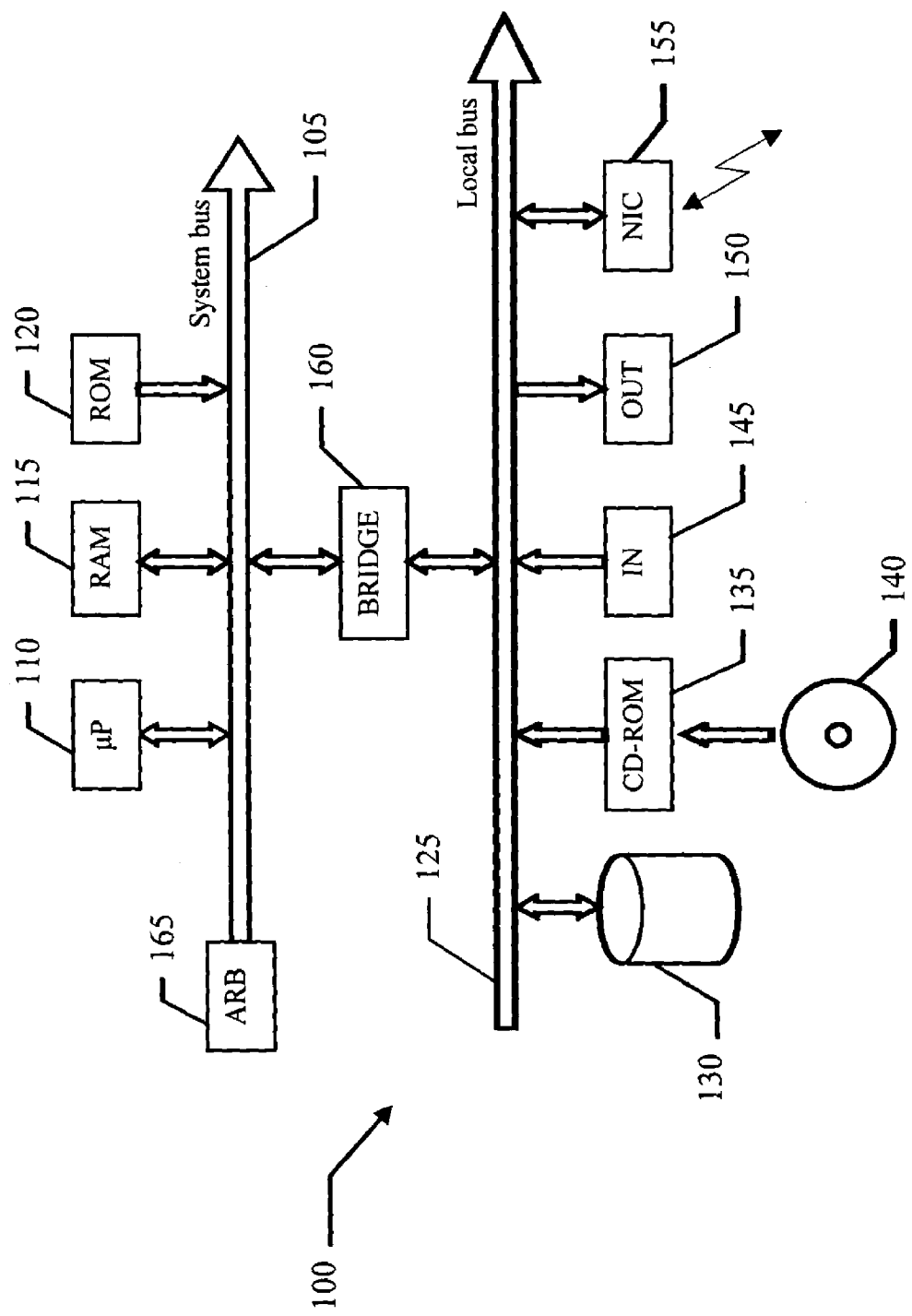
FIG. 1 is a schematic block diagram of a computer in which the method of the invention is applicable.

With reference in particular to FIG. 1, a computer 100 (such as a PC) is shown. The computer 100 is formed by several units that are connected in parallel to a system bus 105. In detail, a microprocessor (μP) 110 controls operation of the computer 100; a RAM 115 is directly used as a working memory by the microprocessor 110, and a ROM 120 stores basic code for a bootstrap of the computer 100. Peripheral units are clustered around a local bus 125 (by means of respective interfaces). Particularly, a mass memory consists of a hard-disk 130 and a drive 135 for reading CD-ROMs 140. Moreover, the computer 100 includes input devices 145 (for example, a keyboard and a mouse), and output devices 150 (for example, a monitor and a printer). A Network Interface Card (NIC) 155 is used to connect the computer 100 to a network. A bridge unit 160 interfaces the system bus 105 with the local bus 125. The microprocessor 110 and the bridge unit 160 can operate as master agents requesting an access to the system bus 105 for transmitting information. An arbiter 165 manages the granting of the access with mutual exclusion to the system bus 105.

Figure 2:
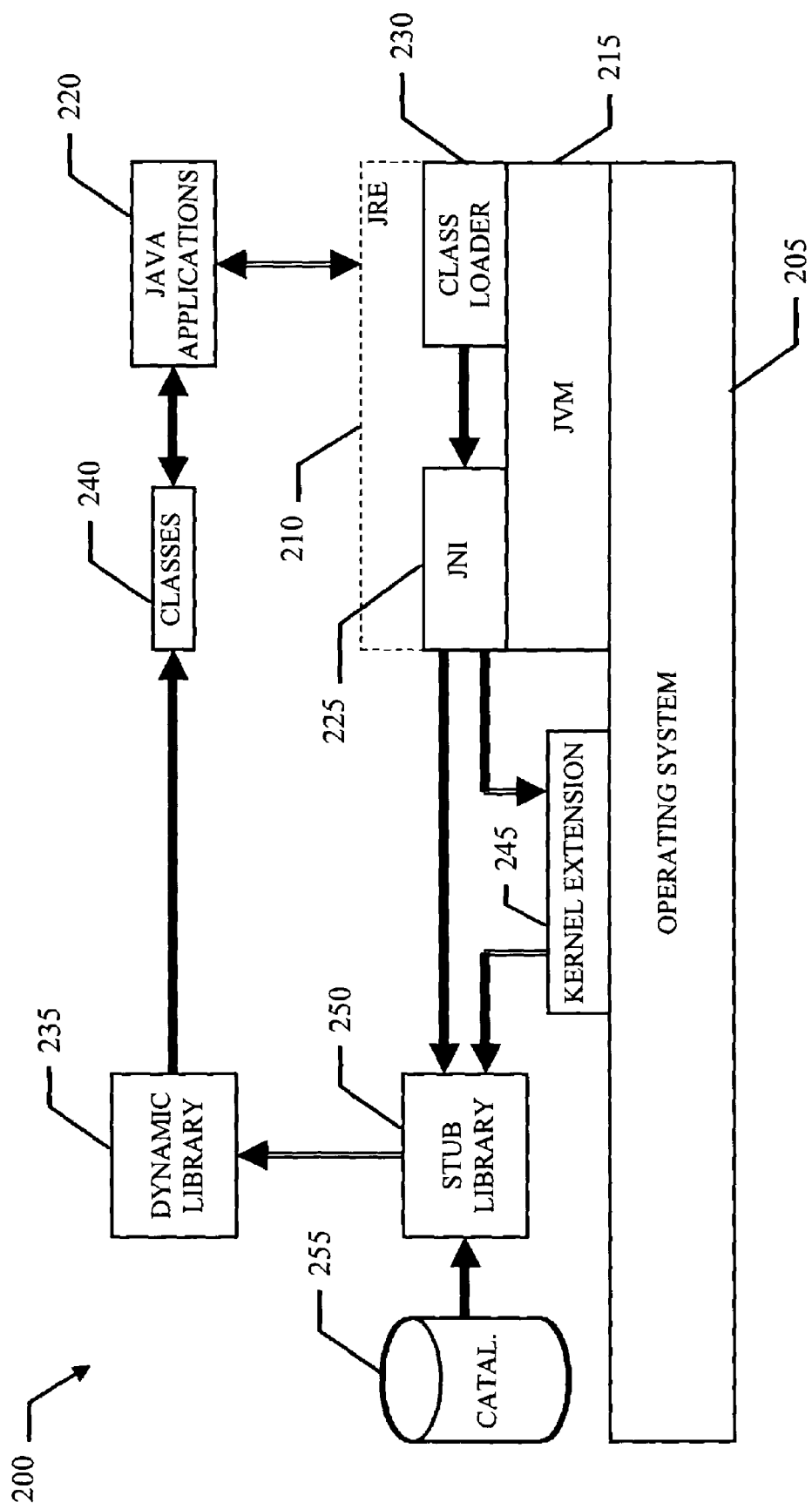
FIG. 2 depicts the main software components that can be used for practicing the method.

Considering now FIG. 2, the main software components that can be used to practice the method of the invention are denoted as a whole with 200. The information (programs and data) is typically stored on the hard-disk and loaded (at least partially) into the working memory when the programs are running. The programs are initially installed onto the hard-disk from CD-ROM.

Particularly, an operating system (OS) 205 provides a software platform for the computer. A Java Runtime Environment (JRE) 210 is installed over the operating system 205. The JRE 210 includes a Java Virtual Machine (JVM) 215 and Java core classes, which define a standard environment for running applications 220 written in the Java language (irrespective of the hardware/software platform of the computer); typically, the Java applications 220 are converted into an intermediate format (called bytecode format) by replacing their instructions with single byte tokens.

The JVM 215 lacks built-in capabilities for communicating with the computer directly. For this purpose, the JVM 215 exploits a Java Native Interface (JNI) 225. The JNI 225 allows Java classes to operate with applications and libraries written in other languages (and vice-versa); particularly, the JNI 225 supports the invocation of native functions, which are specifically designed for the particular hardware/software platform of the computer (for example, to read or write files, print text, or open sockets).

A typical example is the loading of a new class, which is requested by a Java application 220 to a class loader 230. Particularly, the class loader 230 receives the name of the new class, and attempts to locate or generate data that constitutes its definition. A commonplace strategy is to transform the name of the new class into the name of a file, and then read the definition of the new class from the file of that name. The above-described operation requires the interaction with a file system, which is in its nature dependent on the platform of the computer. Therefore, the class loader 230 must invoke corresponding native functions through the JNI 225.

The native functions are typically implemented by libraries 235 that are linked dynamically (for example, in the above-described situation the JNI 225 exploits a dynamic library 235 to read the file storing the definition of any new class 240 requested by the Java applications 220). Whenever a Java application 220 needs a service involving a native function, a corresponding request is provided to the JNI 225. In turn, the JNI 225 asks the operating system 205 to load the corresponding dynamic library 235.

In an embodiment of the invention, the loading request is intercepted by a kernel extension module 245 (using a so-called hooking technique). The kernel extension module 245 causes the loading of a stub library 250 (instead of the dynamic library 235). Therefore, when the JNI 225 calls a command corresponding to the desired native function, the stub library 250 takes control of the operation. The stub library 250 accesses a catalogue 255, which lists a series of known Java applications 220; the Java applications 220 are flagged according to whether they are authorized or not to run on the computer. The catalogue 255 associates each Java application 220 with one or more native functions being indicative of its running; preferably, each Java application 220 is identified by the name of one or more classes that are requested for execution. The stub library 250 then loads the actual dynamic library 235 and forwards the desired command.

Figure 3A:
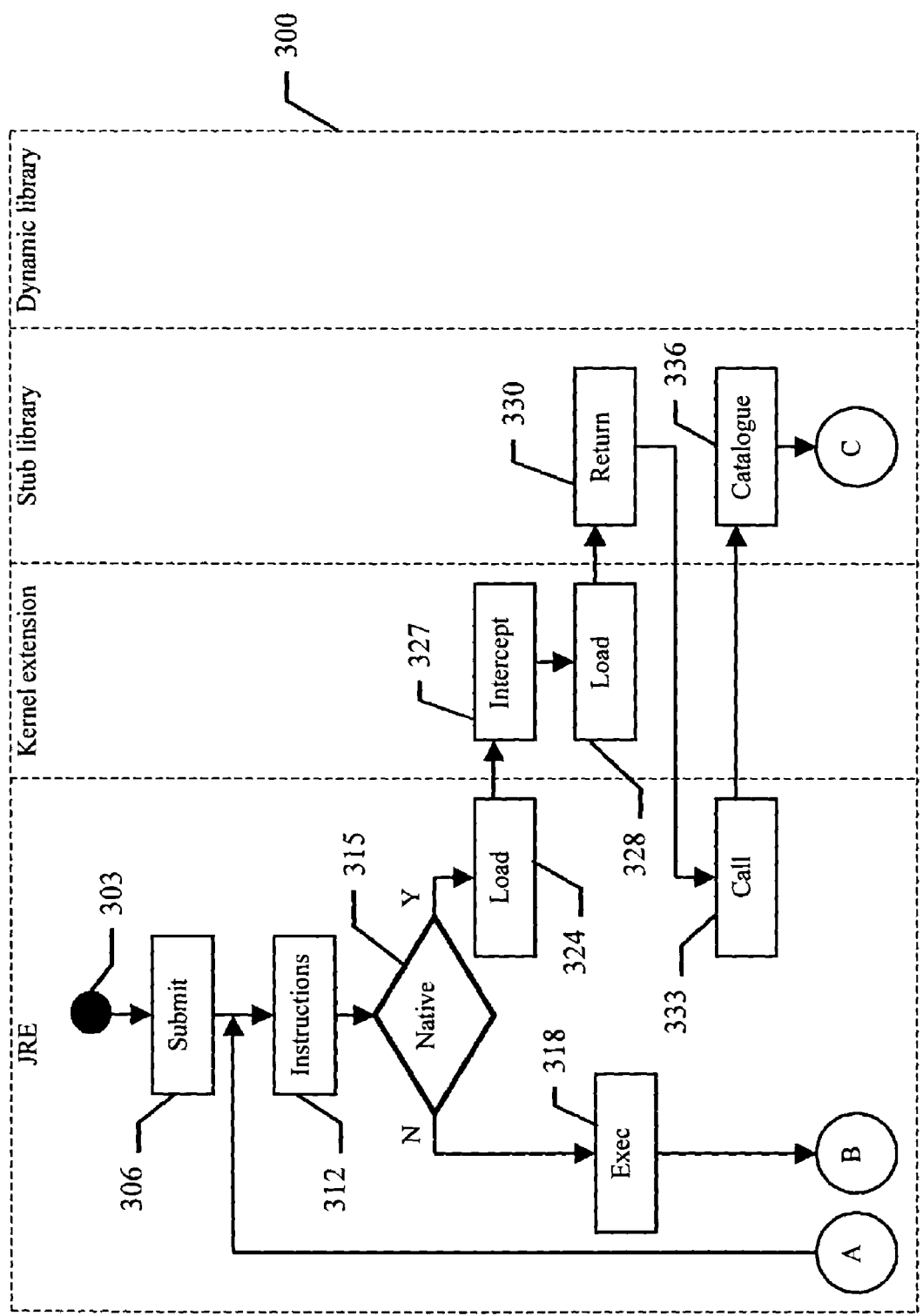
FIGS. 3a-3b show a diagram describing the flow of activities relating to an illustrative implementation of the method.
Figure 3B:
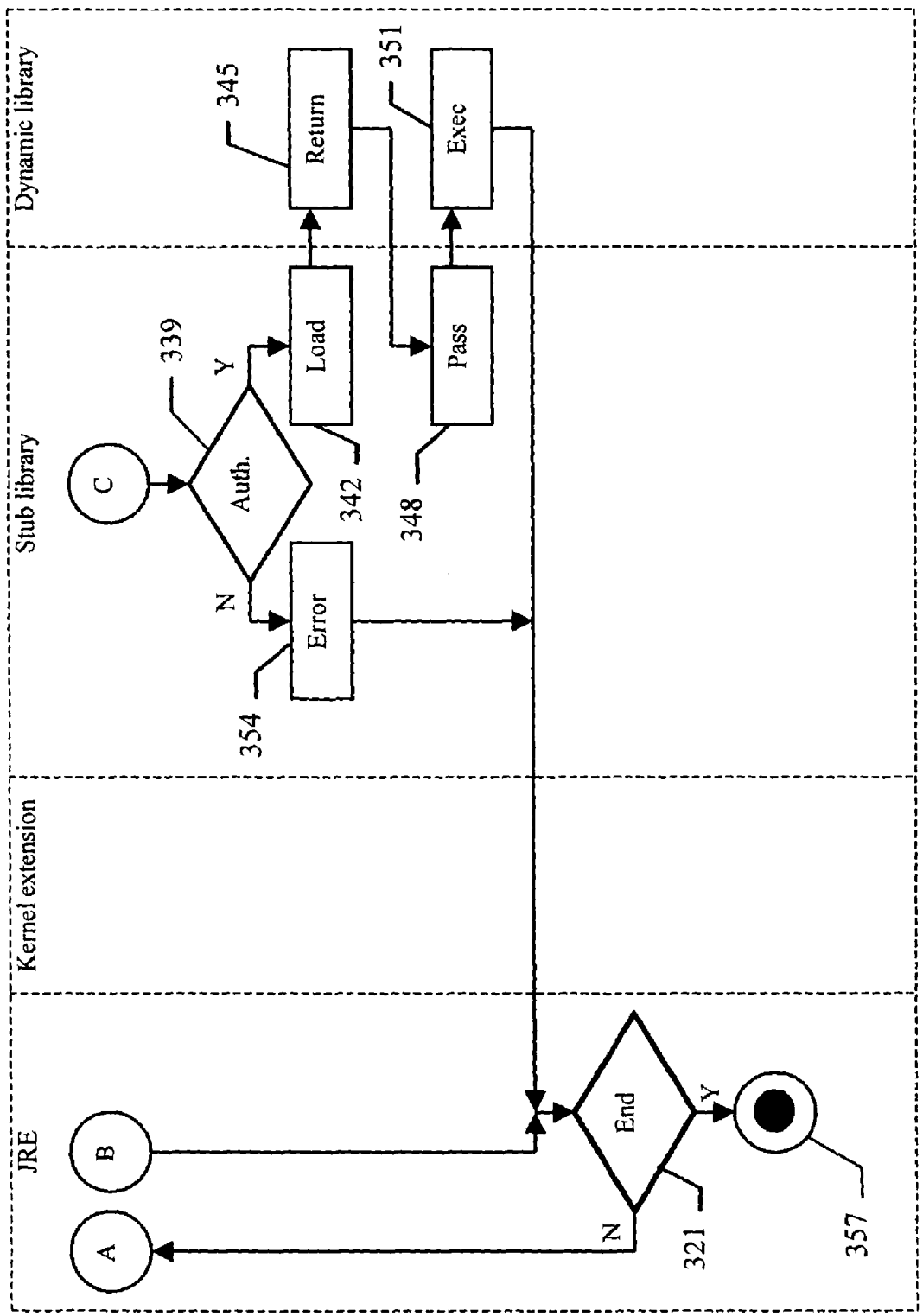

As shown in FIGS. 3a-3b, a corresponding process 300 begins at the black start circle 303 (in the swim-lane of the JRE). Continuing to block 306, a generic Java application is submitted for execution. A loop is then performed for running the Java application by the JVM.

The loop starts at block 312, wherein the code of the Java application is parsed and a current instruction is interpreted. The flow of activity then branches at decision block 315. If the instruction involves operations that are supported by the JVM directly, those operations are executed at block 318. The method then descends into block 321 (described in the following).

Conversely, when the Java application requests a service relating to a native function (for example, the loading of a new class), the JVM at block 324 asks the operating system (through the JNI) to load the corresponding dynamic library. However, the request is intercepted by the kernel extension module at block 327. In response thereto, the kernel extension module at block 328 loads the stub library (instead of the requested dynamic library). Passing to block 330, the control of the process returns to the JVM. With reference now to block 333, the JVM calls the command implementing the requested service (for example, to read the file storing the definition of the new class); as a consequence, the command is called on the stub library (which code has been linked instead of the one of the dynamic library). In this way, the stub library acts as a proxy between the JRE and the dynamic library.

The process continues to block 336 in the swim-lane of the stub library. In this phase, the stub library queries the corresponding catalogue to identify the Java application that is associated with the native function being invoked; in the example at issue, the stub library looks for the name of the new class (passed as a parameter in the command called by the JVM). If the new class identifies a (known) Java application listed in the catalogue, the corresponding entry indicates whether the Java application is authorized or not to run on the computer; conversely, the unknown Java application is deemed not authorized by default (or a user is prompted to define its authorization at run-time). In this way, the Java application that is run by the JVM can be identified in a very simple and flexible manner.

If the Java application is authorized to run (block 339), the stub library actually loads the desired dynamic library at block 342. Considering now block 345, the control of the process returns to the stub library. The stub library then passes the desired command to the dynamic library at block 348. In response thereto, the dynamic library executes the corresponding operations at block 351 (i.e., loads the definition of the new class). The flow of activity then descends into block 321. As a consequence, the operation is completely opaque to the JVM and the Java application.

Referring back to block 339, if the Java application is not authorized to run the process continues to block 354; in this case, an error message is returned to the JVM (without performing any operation). The process likewise proceeds to block 321. Therefore, the new class is not loaded, thereby preventing the Java application to run; this feature allows performing a hard-stop of the Java application in a very safe manner.

Considering now block 321, a test is made to determine whether the execution of the Java application has been completed. If not, the flow of activity returns to block 312 to repeat the operations described above for a next instruction. On the contrary, the process ends at the concentric white/black stop circles 357.

Therefore, the running of whatever Java application can be detected irrespective of its nature; this result is achieved exploiting the standard operative mode of the JVM, and especially without the need of disabling its run-time optimizations.

Figure 4:
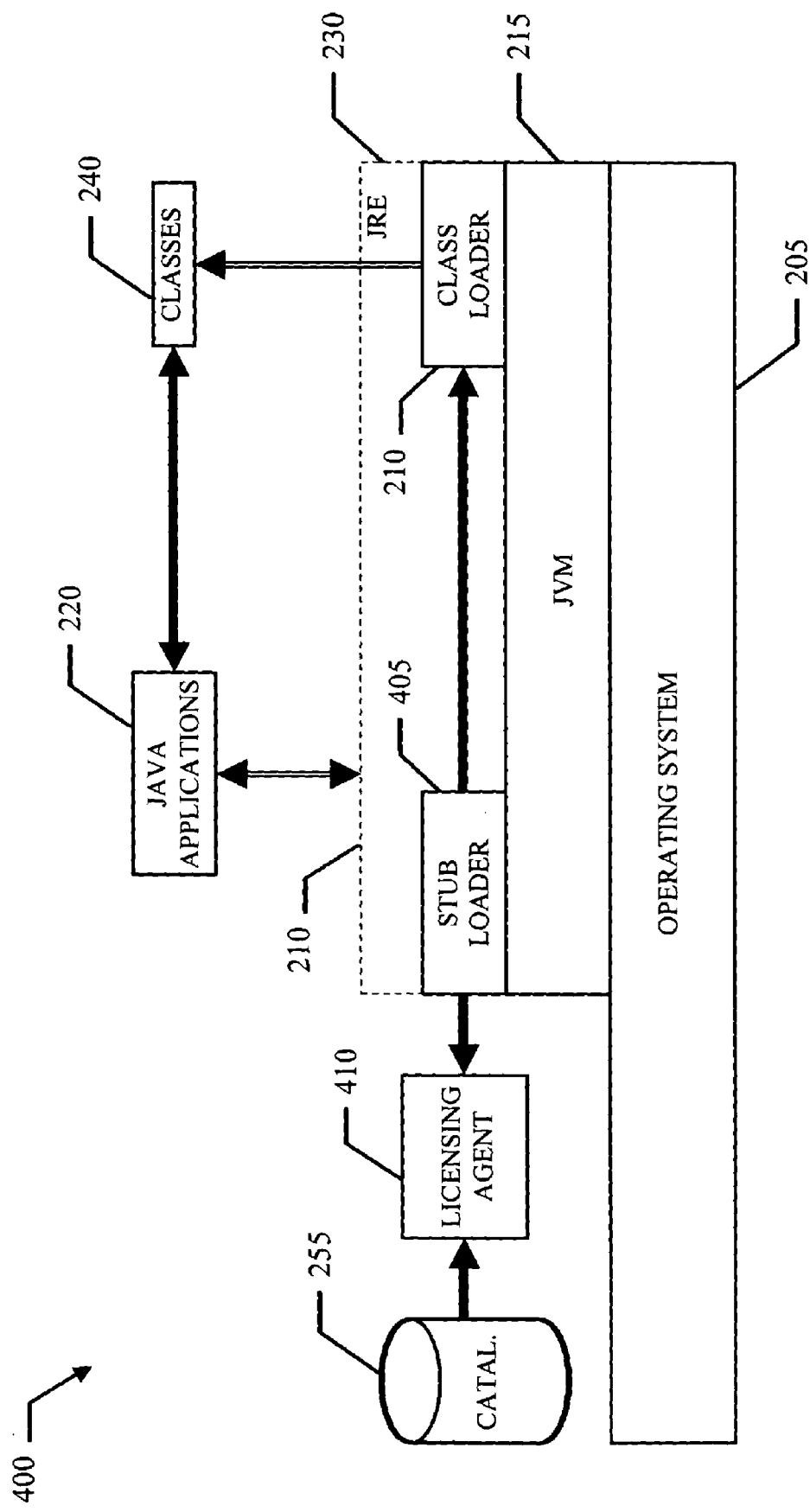
FIG. 4 depicts the main software components that can be used in an alternative embodiment of the invention.

The main software components of a different embodiment of the invention are illustrated in FIG. 4 (the elements corresponding to the ones shown in the FIG. 2 are denoted with the same references, and their explanation is omitted for the sake of brevity). In this case, the (original) class loader 210 is stubbed by a module 405. The stub class loader 405 interfaces with a licensing agent 410, which accesses the catalogue 255.

Figure 5A:
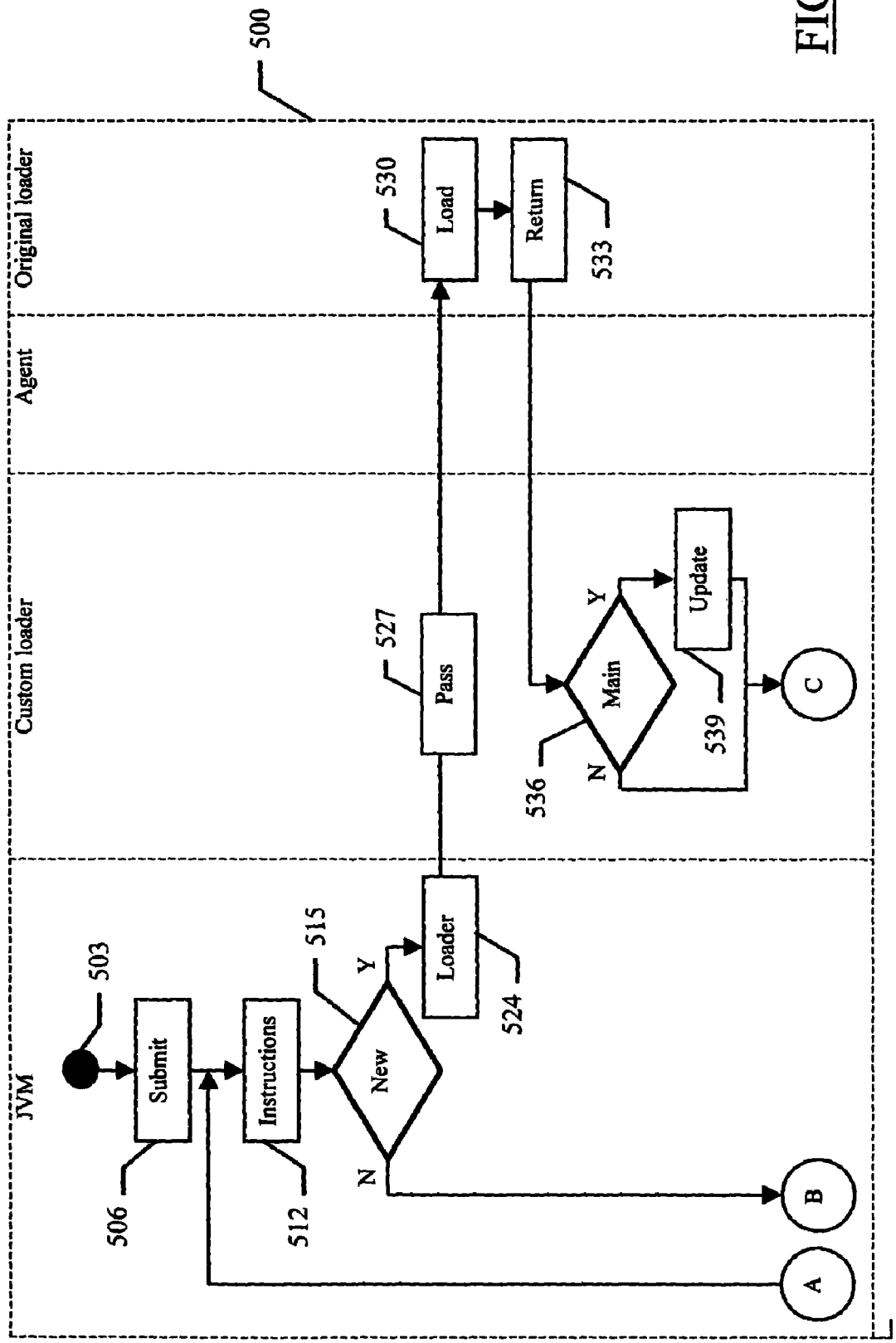
FIGS. 5a-5b show a diagram describing the flow of activities relating to the alternative embodiment.
Figure 5B:
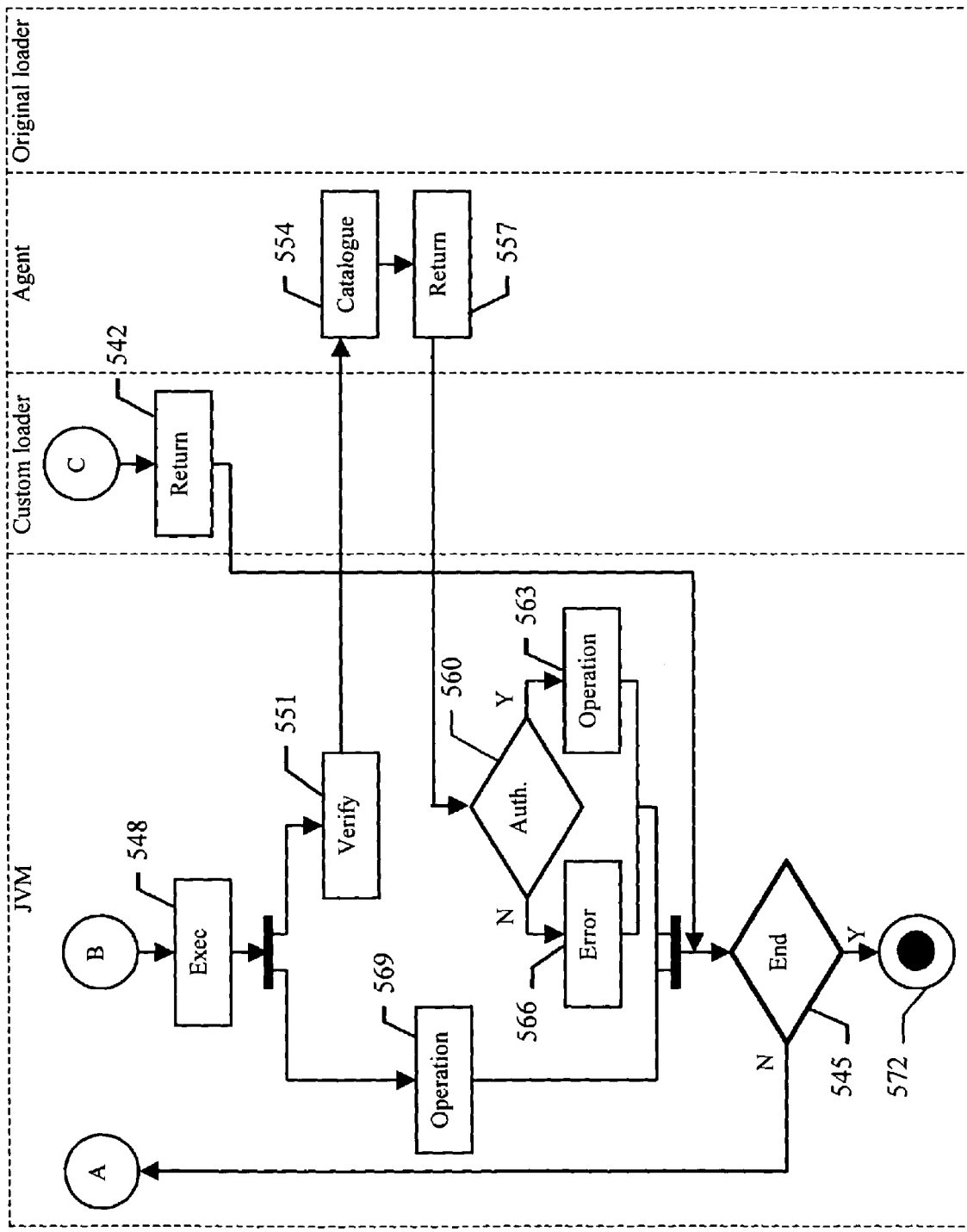

As shown in FIGS. 5a-5b, a corresponding process 500 begins at the black start circle 503 (in the swim-lane of the JVM). Continuing to block 506, a generic Java application is submitted for execution. A loop is then performed for running the Java application by the JVM.

The loop starts at block 512, wherein the code of the Java application is parsed and a current instruction is interpreted. The flow of activity then branches at decision block 515. If the instruction involves the loading of a new class, the operation is requested to the stub class loader at block 524. The request is then passed to the original class loader at block 527. In response thereto, the original class loader at block 530 actually loads the definition of the new class. The definition of the new class is returned to the stub class loader at block 533. The stub class loader verifies at block 536 whether the definition of the new class includes a main method, which typically defines an entry-point of the Java application. The main method has the following signature:

public static void main (String[] args) (i.e., it receives a single argument consisting of an array of elements of type "String", and does not return any result). If the result of the verification is positive, the flow of activity continues to block 539, wherein the main method is updated to include a call to the licensing agent as its first operation. The flow of activity then passes to block 542. The same point is also reached from block 536 directly if the definition of the new class does not include the main method. Considering now block 542, the control of the process returns to the JVM. The method then descends into block 545 (described in the following).

Referring back to block 515, if the instruction does not involve the loading of a new class the execution of the corresponding operation is started at block 548. The flow of activity then forks according to the required operation. Particularly, if the instruction consists of the invocation of the main method, its execution will cause the calling of the licensing agent at block 551 (passing the name of the class on which the method has been invoked). Moving to block 554, the licensing agent queries the corresponding catalogue to identify the Java application that is associated with that class. The result of the query is returned to the JVM at block 557. The method then branches at block 560 according to whether the Java application is authorized or not to run on the computer. If so, the method continues to block 563 wherein the actual operation defined in the main method is executed. Conversely, the Java application is aborted at block 566. In both cases, the method then descends into block 545. Referring back to block 548, if the instruction does not consist of the invocation of the main method, the corresponding operation is executed at block 569. The flow of activity likewise proceeds to block 545.

The method joints again at block 545, wherein a test is made to determine whether the execution of the Java application has been completed. If not, the flow of activity returns to block 512 to repeat the operations described above for a next instruction. On the contrary, the process ends at the concentric white/black stop circles 572.

Although the invention has been described above with a certain degree of particularity with reference to preferred embodiment(s) thereof, it should be understood that various changes in the form and details as well as other embodiments are possible.

Particularly, the reference to the Java language is merely illustrative; similar considerations apply to different languages (such as VisualBasic), to scripts, or more generally to any other interpreted programs (i.e., programs that cannot be executed directly on the computer but run under the control of an interpreter, either directly or after a pre-conversion).

Moreover, the invention is applicable in a computer with another structure or with equivalent units, in a network of computers, in a palmtop or more generally in any other data processing system. Alternatively, the programs and the corresponding data are structured in a different manner, or the programs are distributed on any other computer readable medium (such as a DVD).

Alternatively, the invocation of the external function is intercepted in another way. For example, it is possible to detect the starting of the JVM (using the kernel hooking technique) and then load the stub library immediately. Another possibility is that of renaming the dynamic library and replacing it with the stub library on the hard-disk. Moreover, in a different embodiment of the invention the stub class loader identifies the Java application directly when the loading of a new class is requested.

Similar considerations apply if the catalogue is stored elsewhere (or it consists of a different memory structure associating each interpreted program with one or more corresponding external functions), or if the authorization to run the interpreted program is verified in another way (for example, querying a dedicated server).

Moreover, it will be apparent to those skilled in the art that the additional features providing further advantages are not essential for carrying out the invention, and may be omitted or replaced with different features.

For example, the present invention is also suitable to be implemented when external functions different from the loading of new classes are taken into account (even if the external functions are not of the native type); for example, it is possible to intercept the opening of a network communication with a specific server, or the launching of another program.

Moreover, the solution of the invention can also be practiced when the invocation of the external function does not involve the loading of a dynamic library (for example, when the external function is implemented by an executable module running in a distinct process).

In any case, the use of the proposed solution in a context different from the licensing management is contemplated. Particularly, the information that has been detected about the interpreted programs can be used for reporting purposes only (without any verification of their authorizations). Alternatively, the interpreted program is always allowed to run (for example, only logging an exception when it is not authorized).

Moreover, the proposed method leads itself to be implemented by a computer application that is pre-loaded onto the hard-disk, is sent to the computer through a network (typically the Internet), is broadcast, or more generally is provided in any other form directly loadable into a working memory of the computer. However, the method according to the present invention is also suitable to be carried out with a hardware structure (for example, integrated in a chip of semiconductor material), or with a combination of software and hardware.

Naturally, in order to satisfy local and specific requirements, a person skilled in the art may apply to the solution described above many modifications and alterations all of which, however, are included within the scope of protection of the invention as defined by the following claims.

The invention claimed is:

1. A method of metering execution of interpreted programs on a data processing system, the method including the steps of:
   an interpreted program requesting a service to an interpreter running the interpreted program,
   the interpreter invoking a native external function for implementing the service, wherein the native external function involves the loading of a new class, the interpreted program being identified according to the new class,
   intercepting the invocation of the native external function, wherein the step of intercepting the invocation of the native external function includes receiving a request for the loading of the new class by a stub class loader replacing an original class loader, wherein the step of intercepting the invocation of the native external function further includes the steps under the control of the stub class loader of: forwarding the request for the loading of the new class to the original class loader, verifying whether the loaded new class includes a main method for launching the interpreted program, and inserting a call to a verification module into the main method for determining the interpreted program when the main method is executed,
   identifying the interpreted program according to the native external function by accessing a catalogue which associates native functions with interpreted programs, and
   performing a license management operation according to the identified interpreted program.

2. The method according to claim 1, wherein the native external function consists of a native function of the system.

3. The method according to claim 1, wherein the step of invoking the native external function includes:

requesting the loading of a dynamic library, and calling a command exposed by the dynamic library, and wherein the step of intercepting the invocation of the native external function includes:

loading a stub library in place of the dynamic library to cause the calling of the command on the stub library.

4. The method according to claim 1, wherein the method further includes the steps of:

verifying an authorization to execute the interpreted program, and enabling the invocation of the native external function in response to a positive result of the verification.

5. The method according to claim 4, further including the step of:

preventing the invocation of the native external function and returning an error message to the interpreter in response to a negative result of the verification.

6. A computer program product in a computer storage medium including program code means directly loadable into a working memory of a data processing system for metering execution of interpreted programs, performing the method comprising:

requesting a service by an interpreted program to an interpreter running the interpreted program, invoking a native external function for implementing the service, intercepting the invocation of the native external function, identifying the interpreted program according to the native external function by accessing a catalogue which associates native functions with interpreted programs, performing a license management operation according to the identified interpreted program, and replacing an original class loader with a stub class loader that is operable for receiving a request for the loading of the new class, forwarding the request for the loading of the new class to the original class loader, verifying whether the loaded new class includes a main method for launching the interpreted program, and inserting a call to a verification module into the main method for determining the interpreted program when the main method is executed.

* * * * *